US011862202B2

(12) United States Patent
Johnson et al.

(10) Patent No.: US 11,862,202 B2
(45) Date of Patent: Jan. 2, 2024

(54) DATA STORAGE DEVICE WITH SMART ISOFET THRESHOLD VOLTAGE AUTOMATIC TUNING

(71) Applicant: Western Digital Technologies, Inc., San Jose, CA (US)

(72) Inventors: Brian Johnson, Laguna Hills, CA (US); Jaesoo Byoun, Irvine, CA (US); Hideaki Ito, Fujisawa (JP); Gaku Ikedo, Fujisawa (JP); Naoyuki Kagami, Fujisawa (JP)

(73) Assignee: Western Digital Technologies, Inc.

( * ) Notice: Subject to any disclaimer, the term of this patent is extended or adjusted under 35 U.S.C. 154(b) by 9 days.

(21) Appl. No.: 17/739,552

(22) Filed: May 9, 2022

(65) Prior Publication Data

US 2023/0360680 A1 Nov. 9, 2023

(51) Int. Cl.
*G11B 27/36* (2006.01)
*G11B 21/02* (2006.01)

(52) U.S. Cl.
CPC .............. *G11B 27/36* (2013.01); *G11B 21/02* (2013.01)

(58) Field of Classification Search
None
See application file for complete search history.

(56) References Cited

U.S. PATENT DOCUMENTS

| 5,600,217 | A | * | 2/1997 | Bartlett | ................ | G11B 33/122 |
| | | | | | | 360/69 |
| 6,566,832 | B2 | | 5/2003 | Ataee | | |
| 6,967,378 | B2 | | 11/2005 | Nishikawa et al. | | |
| 8,829,837 | B2 | | 9/2014 | Galbiati | | |
| 9,245,577 | B1 | | 1/2016 | Byoun | | |
| 9,362,855 | B2 | | 6/2016 | Bonvin et al. | | |
| 9,899,834 | B1 | | 2/2018 | Mayo | | |
| 10,256,751 | B2 | | 4/2019 | Bonvin | | |

FOREIGN PATENT DOCUMENTS

EP    2 306 631 A1    4/2011

OTHER PUBLICATIONS

"MP5515 Wide Input 2.7-18V, 5A, High-Efficiency Bidirectional, Power Back-Up Manager with Integrated Hot-Swap, I2C, ADC, and Cap Health Test", MPS The Future of Analog IC Technology, 1-40 pages, 2018.

* cited by examiner

*Primary Examiner* — Craig A. Renner
(74) *Attorney, Agent, or Firm* — Neugeboren O'Dowd PC (57) ABSTRACT

Various illustrative aspects are directed to a data storage device comprising a disk and a spindle motor configured to rotate the disk wherein the spindle motor is powered by a drive voltage generated in response to a host voltage. The data storage device includes a head configured to be actuated over the disk by a head actuator and control circuitry comprising an isolation field effect transistor (ISOFET) configured to prevent a reverse current from flowing from the drive voltage to the host voltage when the host voltage falls below a threshold. The control circuitry sets a turnoff current level at which the ISOFET is directed to turn off to prevent the reverse current from flowing determines a drain-source on resistance Rdson of the ISOFET, and calculates a voltage turnoff threshold at which the ISOFET is turned off from the turnoff current level and the determined Rdson.

21 Claims, 5 Drawing Sheets

FIG. 4 ary power off (EPO) event.
DATA STORAGE DEVICE WITH SMART ISOFET THRESHOLD VOLTAGE AUTOMATIC TUNING

BACKGROUND

Data storage devices such as disk drives comprise a disk and a head connected to a distal end of an actuator arm that is rotated about a pivot by a heat actuator (e.g., a voice coil motor (VCM)) to position the head radially over the disk. The disk comprises a plurality of radially spaced, concentric tracks for recording user data sectors and servo sectors. The servo sectors comprise head positioning information (e.g., a track address) that is read by the head and processed by a servo control system to control the actuator arm as it seeks from track to track.

Figure 1:
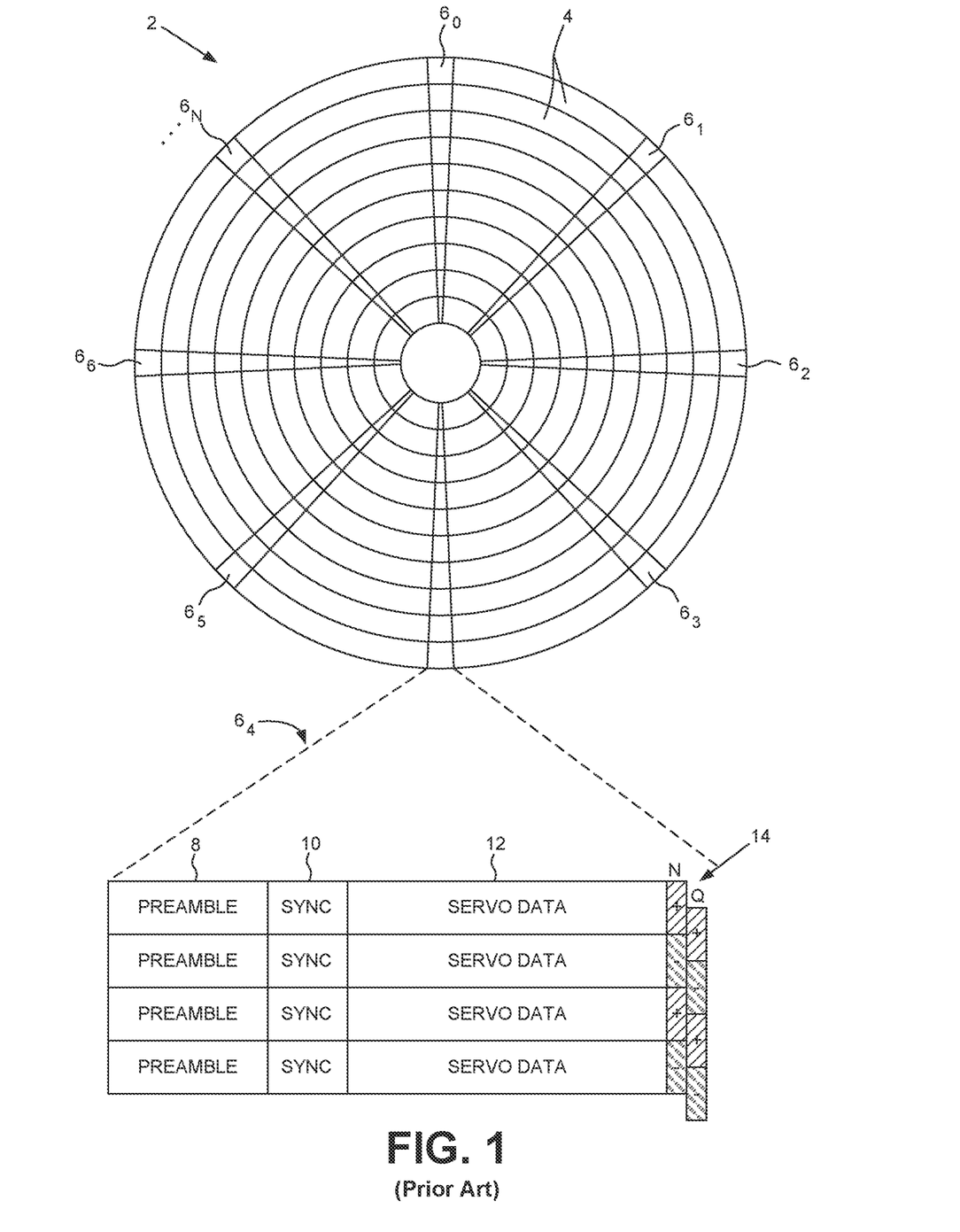
FIG. 1 shows a prior art disk format comprising a plurality of servo tracks defined by servo sectors.

FIG. 1 shows a prior art disk format 2 comprising a plurality of servo tracks 4 defined by servo sectors $6_0$-$6_N$ recorded around the circumference of each servo track 4. Each servo sector $6_i$ comprises a preamble 8 for storing a periodic pattern that allows proper gain adjustment and timing synchronization of the read signal, and a sync mark 10 for storing a special pattern used to symbol synchronize to a servo data field 12. Servo data field 12 stores coarse head positioning information, such as a servo track address, used to position the head over a target data track during a seek operation. Each servo sector $6_i$ further comprises groups of servo bursts 14 (e.g., N and Q servo bursts) that are recorded with a predetermined phase relative to one another and relative to the servo track centerlines. The phase-based servo bursts 14 provide fine head position information used for centerline tracking while accessing a data track during write/read operations. A position error signal (PES) is generated by reading servo bursts 14, wherein the PES represents a measured position of the head relative to a centerline of a target servo track. A servo controller processes the PES to generate a control signal applied to the head actuator (VCM) to actuate the head radially over the disk in a direction that reduces the PES.

SUMMARY

Various aspects of this disclosure provide a data storage device having control circuitry including an isolation field effect transistor (ISOFET) configured to prevent excessive reverse current from flowing through the ISOFET to the host during an emergency power off (EPO) event.

One aspect of this disclosure is a data storage device comprising a disk and a spindle motor configured to rotate the disk wherein the spindle motor is powered by a drive voltage generated in response to a host voltage. The data storage device includes a head configured to be actuated over the disk by a head actuator and control circuitry comprising an isolation field effect transistor (ISOFET) configured to prevent a reverse current from flowing from the drive voltage to the host voltage when the host voltage falls below a threshold. The control circuitry sets a turnoff current level at which the ISOFET is directed to turn off to prevent the reverse current from flowing determines a drain-source on resistance Rdson of the ISOFET, and calculates a voltage turnoff threshold at which the ISOFET is turned off from the turnoff current level and the determined Rdson.

Another aspect of this disclosure is a method for preventing reverse current flow through an isolation field effect transistor (ISOFET) of a data storage device. The method comprises setting a turnoff current level at which the ISOFET is turned off to prevent the reverse current from flowing, determining a drain-source on resistance Rdson of the ISOFET, and calculating a voltage turnoff threshold at which the ISOFET is turned off from the turnoff current level and the determined Rdson.

In a further aspect of this disclosure a method for preventing reverse current flow through an isolation field effect transistor (ISOFET) of a data storage device comprises setting a first command current for a host voltage and a drive voltage of the data storage device, measuring a first host analog-to-digital (ADC) voltage, a first drive ADC voltage and a first ADC current at the first command current, setting a second command current for the host voltage and the drive voltage of the data storage device, measuring a second host ADC voltage, a second drive ADC voltage and a second ADC current at the second command current, calculating a Rdson of the ISOFET, calculating a voltage turnoff threshold, and selecting a pre-programmed voltage turnoff threshold that is closest to the calculated voltage turnoff threshold.

Various additional aspects of this disclosure are depicted and described in the accompanying drawings and the following description.

BRIEF DESCRIPTION OF THE DRAWINGS

Various features and advantages of this disclosure will be apparent from the following description and accompanying drawings. The drawings are not necessarily to scale; emphasis instead is placed on illustrating the principles of this disclosure. In the drawings, like reference characters may refer to the same parts throughout the different figures. The drawings depict illustrative examples of this disclosure and are not limiting in scope.

DETAILED DESCRIPTION

Figures 2A, 2B:
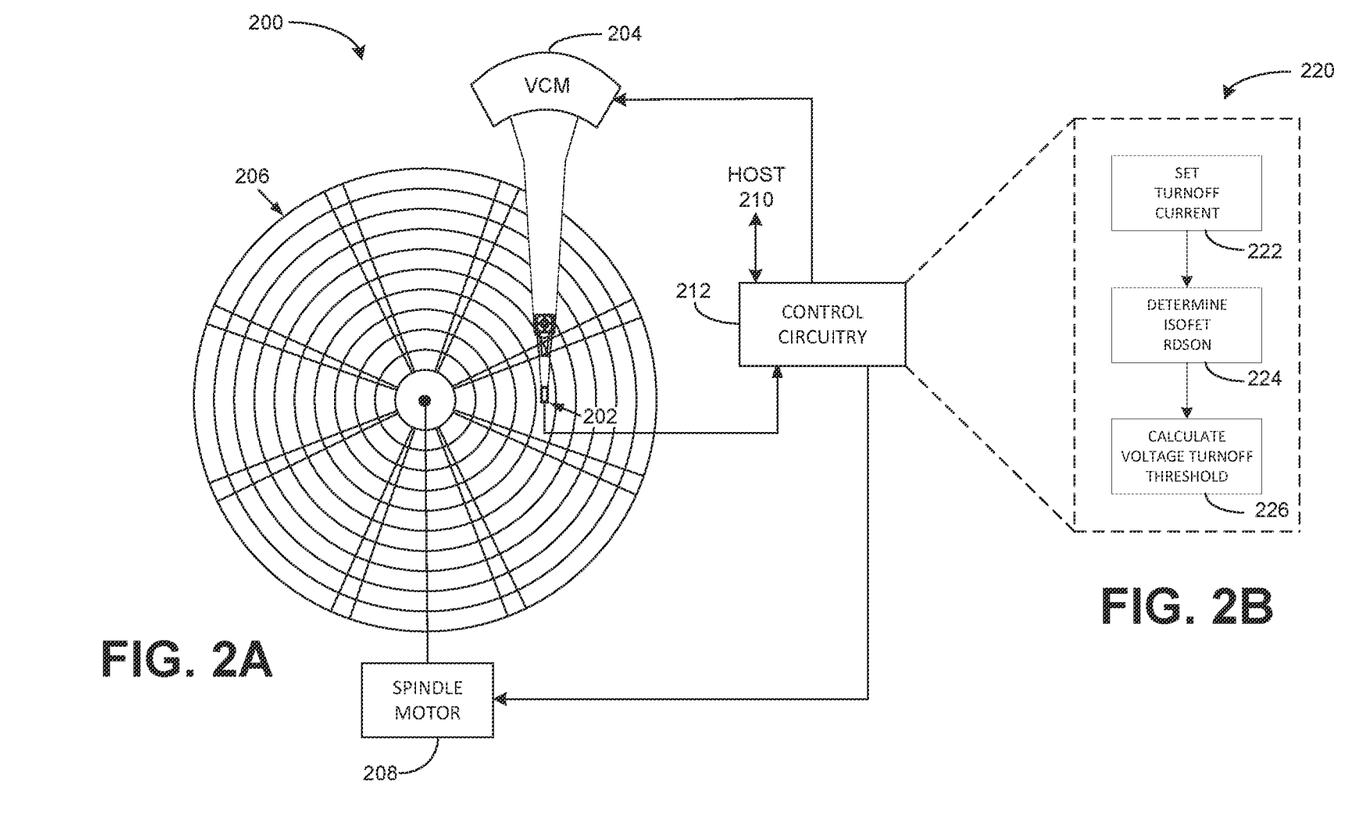
FIG. 2A shows a data storage device in the form of a disk drive comprising a head actuated over a disk rotated by a spindle motor, in accordance with aspects of this disclosure.
FIG. 2B is a flow diagram of a method that the data storage device of FIG. 2A may perform, in accordance with aspects of this disclosure.

FIG. 2A shows a data storage device in the form of a disk drive 200, in accordance with aspects of this disclosure. Disk drive 200 comprises a head 202 configured to be actuated by a head actuator (VCM) 204 over a disk 206, and a spindle motor 208 configured to rotate disk 206. Spindle motor 208 comprises a plurality of windings and is powered by a drive voltage generated in response to a host voltage 210. Disk drive 200 further comprises control circuitry 212 configured to execute method 220 depicted in the flow diagram of FIG. 2B.

During operation of disk drive 200, a power interruption or failure may sometimes occur, which is termed an emergency power off (EPO) event. During an EPO event, it is important that head 202 be parked before the air bearing between head 202 and disk 206 dissipates to prevent damage to head 202 and/or disk 206, such as by unloading head 202 onto a ramp near the outer diameter of disk 206. Disk drive 200 may need to perform other functions during an EPO event, such as egressing cached write data from a volatile semiconductor memory, such as dynamic random-access memory (DRAM), to a non-volatile semiconductor memory, such as flash memory. The drive voltage needs to be carefully managed during an EPO event to support these functions. In particular, when the host voltage falls below a threshold during a power interruption or failure, it is important to prevent reverse current from flowing to the host and thereby depleting the drive voltage.

Figure 3A:
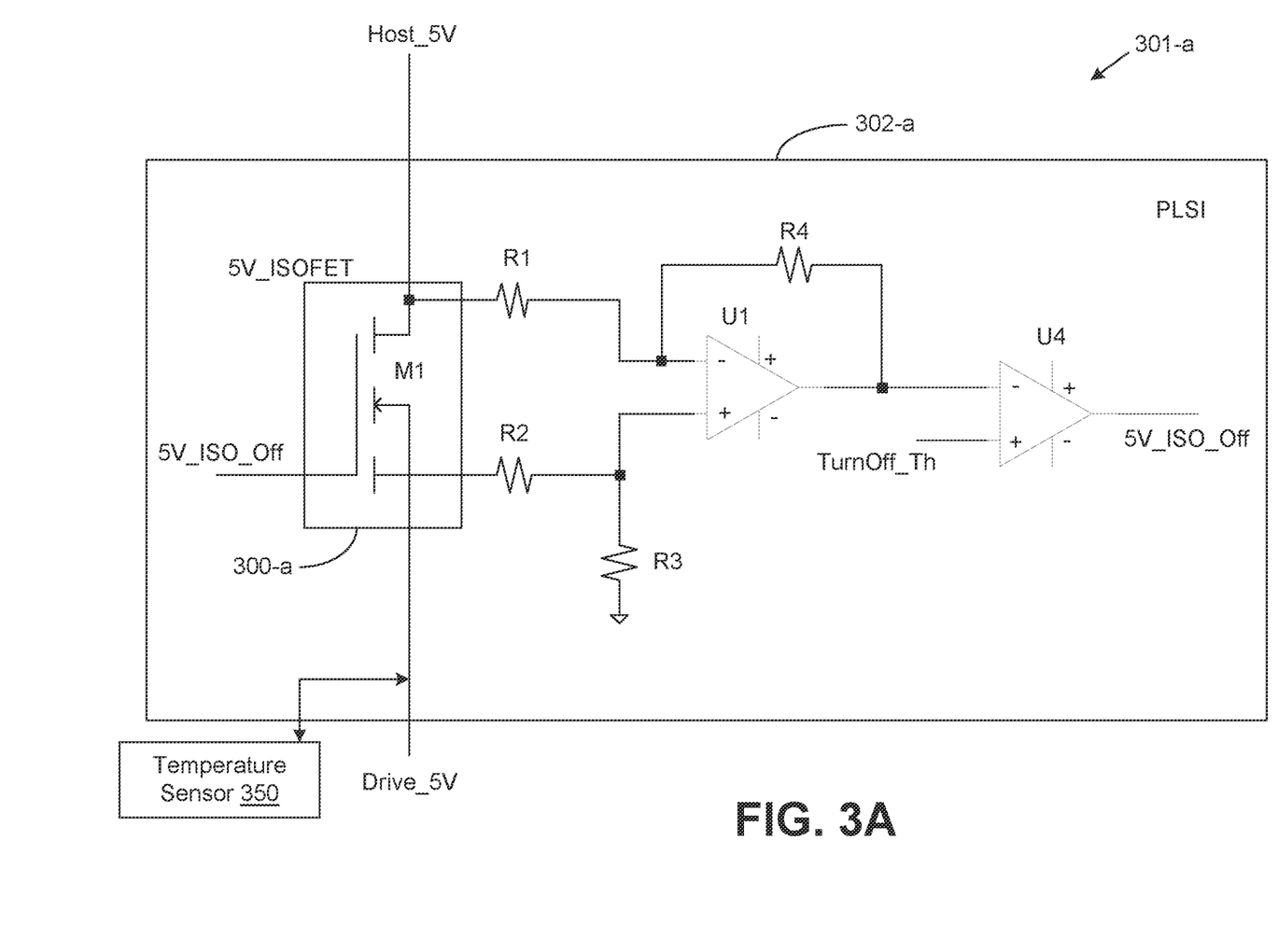
FIGS. 3A and 3B are conceptual diagrams of an ISOFET and associated circuitry for preventing reverse current from flowing to the host during an EPO event, in accordance with aspects of this disclosure.
Figure 3B:
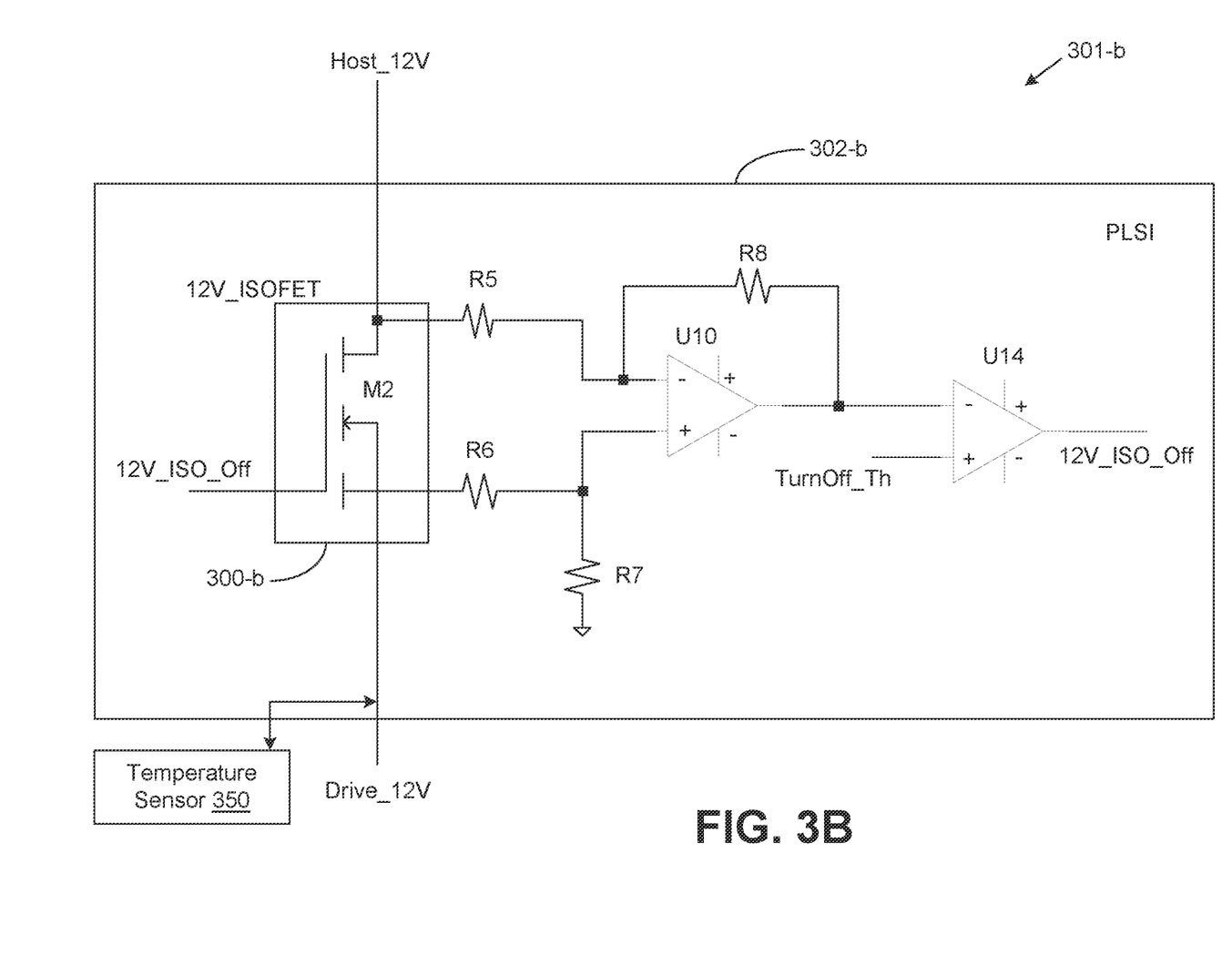

As shown in FIG. 3A (block diagram 301-a), control circuitry 212 comprises an isolation field effect transistor (ISOFET) 300-a configured to prevent excessive reverse current from flowing to the host during an EPO event. In one implementation, ISOFET 300-a is an n-channel metal-oxide semiconductor (NMOS) transistor M1 configured on a power large scale integrated circuit (PLSI) 302-a. ISOFET 300-a of FIG. 3A is connected to the 5 V host voltage (Host_5 V or H5V) and the 5 V drive voltage (Drive_5 V or D5V). In particular, Host 5 V is coupled to the drain of ISOFET 300-a, and Drive_5 V is coupled to the source of ISOFET 300-a. ISOFET 300-a is connected to additional circuitry as shown in FIG. 3A to prevent excessive reverse current from flowing to the host during an EPO event. Though not shown in FIG. 3A, an additional ISOFET is provided for the 12 V host and drive voltages and is configured in the same fashion as ISOFET 300-a of FIG. 3A. FIG. 3B shows a block diagram 301-b depicting an ISOFET 300-b provided for the 12 V host and drive voltages, according to various aspects of the disclosure. In this example, the ISOFET 300-b is configured in the same or similar fashion as ISOFET 300-a described in relation to FIG. 3A. For instance, in one implementation, ISOFET 300-b is an NMOS transistor M2 configured on the PLSI 302-b, where ISOFET 300-b is connected to the 12 V host voltage (Host 12 V or H12V) and the 12 V drive voltage (Drive 12 V or D12V). Similar to FIG. 3A, Host 12 V is coupled to the drain of ISOFET 300-b and Drive 12 V is coupled to the source of ISOFET 300-b.

ISOFET 300 (e.g., ISOFET 300-a or ISOFET 300-b) is in an ON state during normal operation. When excessive reverse current is flowing through ISOFET 300, ISOFET 300 is turned OFF to prevent such excessive reverse current from flowing to the host and draining the drive voltage. The determination as to whether excessive reverse current is flowing through ISOFET 300 (e.g., ISOFET 300-a) is made by comparing the difference between the host and drive voltages with a voltage turnoff threshold. In particular, the host voltage Host_5 V is coupled to the inverting input of comparator U1 via resistor R1, and the drive voltage Drive_5 V is coupled to the non-inverting input of comparator U1 via resistor R2. Resistor R3 is coupled between the non-inverting input of comparator U1 and ground. The output of comparator U1 (the difference between the host and drive voltages, or H5V-D5V) is coupled to the inverting input of comparator U4, as well as back to the inverting input of comparator U1 via resistor R4. Comparator U4 compares the output of comparator U1 (H5V-D5V) with a voltage turnoff threshold (TurnOff_Th or $V_{threshold}$) supplied to the non-inverting input of comparator U4. Based on this comparison, an output signal 5 V_ISO_Off is generated and supplied to the gate of ISOFET 300-a. When the difference between the host and drive voltages exceeds the voltage turnoff threshold, indicating that an EPO event such as a power failure or interruption has occurred, the resultant 5 V_ISO_Off signal is operative to turn ISOFET 300-a off, thereby preventing reverse current from flowing to the host.

Similarly, in FIG. 3B, the host voltage Host 12 V is coupled to the inverting input of comparator U10 via resistor R5, and the drive voltage Drive 12 V is coupled to the non-inverting input of comparator U10 via resistor R6. Resistor R7 is coupled between the non-inverting input of comparator U10 and ground. The output of comparator U10 (the difference between the host and drive voltages) is coupled to the inverting input of comparator U14, as well as back to the inverting input of comparator U10 via resistor R8. Comparator U14 compares the output of comparator U10 (Host 12 V-Drive 12 V) with a voltage turnoff threshold (TurnOff_Th) supplied to the non-inverting input of comparator U14. Based on this comparison, an output signal 12 V_ISO_Off is generated and supplied to the gate of ISOFET 300-b. When the difference between the host and drive voltages exceeds the voltage turnoff threshold, the resultant 12 V_ISO_Off signal is operative to turn ISOFET 300-b off, thereby preventing reverse current from flowing to the host.

The total resistance between the drain and the source of ISOFET 300 (e.g., ISOFET 300-a, ISOFET 300-b) is the drain-source on resistance $R_{DS(on)}$, or Rdson. Thus, when the drive voltage falls below the host voltage, a reverse current flows through ISOFET 300 (e.g., ISOFET 300-a, ISOFET 300-b) towards the host due to the voltage difference. ISOFET 300 may have a wide range of Rdson values, typically between 25 mΩ and 100 mΩ. Because Rdson is variable in this manner, and because the difference between the drive and the host voltages relative to a voltage turnoff threshold is used to determine when ISOFET 300 is turned off (rather than, for example, a direct measurement of the reverse current flow), the reverse current level ((H5V-D5V)/Rdson) at which ISOFET 300 is turned off is variable. Ideally, ISOFET 300 would be turned off at a fixed turnoff current level rather than varying turnoff current levels.

One aspect of this disclosure, implemented by method 220 (FIG. 2B) and performed by control circuitry 212, is to provide a more consistent turnoff current level at which ISOFET 300 (e.g., ISOFET 300-a, ISOFET 300-b) is turned off. With reference to FIG. 2B, in step 222, a desired turnoff current value ($I_{TurnoffCurrent}$) at which ISOFET 300 is turned off is set. In one non-limiting example, the turnoff current for a 5 V ISOFET (ISOFET 300-a) is approximately—150 mA, and the turnoff current for a 12 V ISOFET (ISOFET 300-b) is approximately −200 mA. In step 224, the Rdson of the ISOFET is determined. For non-limiting purposes of illustration, the typical Rdson range for a 5 V ISOFET (e.g., ISOFET 300-a) is approximately 25 mΩ to 100 mΩ, and the typical Rdson range for a 12 V ISOFET (e.g., ISOFET 300-b) is approximately 15 mΩ to 70 mΩ. In step 226, an appropriate voltage turnoff threshold ($V_{threshold}$) is selected in view of the Rdson of the ISOFET and the desired turnoff current ($I_{Turnoffcurrent}$), that is, $V_{threshold} = I_{TurnoffCurrent} *$ Rdson.

In one implementation, the voltage turnoff threshold is selected from among multiple pre-programmed voltage turnoff thresholds, based on where the Rdson of the ISOFET falls within the typical range of Rdson values. In one non-limiting example, the voltage turnoff threshold is selected from among four voltage turnoff thresholds that are stored in two bits of the PLSI hardware to provide programmable flexibility. For the 5 V ISOFET, where the desired turnoff current is typically about −150 mA and the Rdson range is approximately 25 mΩ to 100 mΩ, the voltage turnoff threshold selections are −4 mV, −6 mV, −9 mV and −12 mV. The interplay between the Rdson range, turnoff current and voltage turnoff thresholds for the 5 V ISOFET is illustrated in Table 1 below.

TABLE 1

5 V ISOFET

| Voltage Turnoff Threshold (V) | Rdson Range (Ohms) | | | |
|---|---|---|---|---|
| | Min 0.025 | 0.05 | 0.075 | Max 0.1 |
| | Turnoff Current (A) | | | |
| −0.004 | −0.16 | −0.08 | −0.053333 | −0.04 |
| −0.006 | −0.24 | −0.12 | −0.08 | −0.06 |
| −0.009 | −0.36 | −0.18 | −0.12 | −0.09 |
| −0.012 | −0.48 | −0.24 | −0.16 | −0.12 |

Thus, with reference to Table 1, a turnoff current of approximately −150 mA (−0.15 mA) is desired for the 5 V ISOFET. When the Rdson of the 5 V ISOFET is determined to be at or near the typical range minimum of 25 mΩ(0.025 mΩ), the voltage turnoff threshold of −4 mV (−0.004 V) is selected since it yields the closest turnoff current (−160 mA) to the desired turnoff current (−150 mA). When the Rdson is determined to be at or near 50 mΩ, either the voltage turnoff threshold of −6 mV (turnoff current =−120 mA) or the voltage turnoff threshold of −9 mV (turnoff current =−180 mA) may be selected. When the Rdson is determined to be at or near 75 mΩ, the voltage turnoff threshold of −12 mV (turnoff current =−160 mA) is selected. When the Rdson is determined to be at or near the typical range maximum of 100 mΩ, the voltage turnoff threshold of −12 mV (turnoff current =−120 mA) is selected.

For the 12 V ISOFET, where the desired turnoff current is typically about −200 mA and the Rdson range is approximately 15 mΩ to 70 mΩ, the voltage turnoff threshold selections are −4 mV, −7 mV, −10 mV and −15 mV. The interplay between the Rdson range, turnoff current and voltage turnoff thresholds for the 12 V ISOFET is illustrated in Table 2 below.

TABLE 2

12 V ISOFET

| Voltage Turnoff Threshold (V) | Rdson Range (Ohms): | | | |
|---|---|---|---|---|
| | Min 0.015 | 0.033 | 0.05 | Max 0.07 |
| | Turnoff Current (A) | | | |
| −0.004 | −0.266667 | −0.121212 | −0.08 | −0.057143 |
| −0.007 | −0.466667 | −0.212121 | −0.14 | −0.1 |
| −0.01 | −0.666667 | −0.30303 | −0.2 | −0.142857 |
| −0.015 | −1.0 | −0.454545 | −0.3 | −0.214286 |

Thus, with reference to Table 2, a turnoff current of approximately −200 mA is desired for the 12 V ISOFET. When the Rdson of the 12 V ISOFET is determined to be at or near the typical range minimum of 15 mΩ, the voltage turnoff threshold of −4 mV is selected since it yields the closest turnoff current (−267 mA) to the desired turnoff current (−200 mA). When the Rdson is determined to be at or near 33 mΩ, the voltage turnoff threshold of −7 mV (turnoff current =−212 mA) is selected. When the Rdson is determined to be at or near 50 mΩ, the voltage turnoff threshold of −10 mV (turnoff current =−200 mA) is selected. When the Rdson is determined to be at or near the typical range maximum of 70 mΩ, the voltage turnoff threshold of −15 mV (turnoff current =−214 mA) is selected.

As can be seen from Tables 1 and 2, if the Rdson of the ISOFET can be roughly measured, a more consistent ISOFET turnoff current can be obtained by selecting the right voltage turnoff threshold. In this regard, according to further aspects of this disclosure, methods are provided for roughly measuring the Rdson of the ISOFET such that an appropriate voltage turnoff threshold selection can be made.

In particular, according to aspects of this disclosure, both the 5 V and 12 V currents can be read through an analog-to-digital converter (ADC). Two current levels can be used for both the 5 V and 12 V lines to cancel and remove error contributions from the ADC and other circuit errors. For the 12 V line, for example, two levels of VCM current towards the OD (outer disk—no VCM movement) can be commanded. In one implementation, two current levels of 500 mA and 1 A of VCM current towards the OD are commanded. Multiple current levels for the VCM towards the OD may already be present in a load calibration routine, for example. Thus, extra ADC commands of H12V and D12V may be added during a load calibration sequence without adding any extra time for spin up. For the 5V line, for example, the read channel may be turned on/off which creates a significant 5V change in current. In addition, voltages on both sides of the 5V ISOFET (H5V/D5V) and the 12 V ISOFET (H12V/D12V) can be read through the ADC as well. By using H5V-D5V (or H12V-D12V), voltage ADC error is eliminated because the error is common to both readings. Once these voltage readings are obtained at both current levels, Rdson can be calculated, and the voltage turnoff threshold can then be calculated based on the desired turnoff current.

Figure 4:
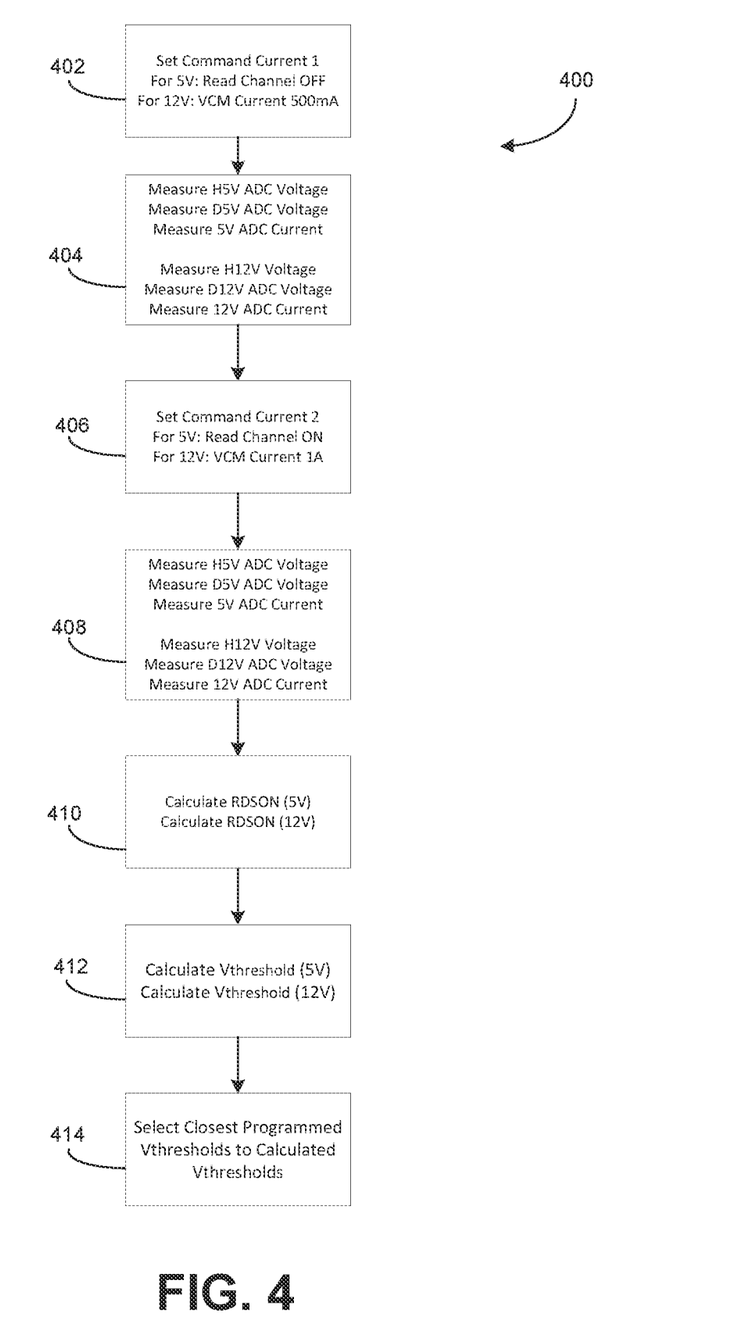
FIG. 4 is a flow diagram for measuring Rdson values and calculating voltage turnoff thresholds, in accordance with aspects of this disclosure.

FIG. 4 is a flow diagram of a method 400 for measuring Rdson values and calculating voltage turnoff thresholds, in accordance with aspects of this disclosure. In step 402, command current 1 is set for both the 5 V and 12 V lines. In one implementation, command current 1 is set as read channel OFF for the 5 V line and is set as 500 mA of VCM current towards the OD for the 12 V line. In step 404, for both the 5 V and 12 V lines, the host and drive ADC voltages are measured at command current 1, and the 5 V and 12 V ADC currents are measured at command current 1. Thus, the following values are obtained in step 404:

5 V ISOFET $H5V_1$=Host 5 V voltage at command current 1 (read channel OFF)

$D5V_1$=Drive 5 V voltage at command current 1 (read channel OFF)

$I_1(5\,V)$ =5 V current at command current 1 (read channel OFF)

12 V ISOFET $H12V_1$=Host 12 V voltage at command current 1 (500 mA VCM current)

$D12V_1$=Drive 12 V voltage at command current 1 (500 mA VCM current)

$I_1(12\,V)$ =12 V current at command current 1 (500 mA VCM current)

In step 406, command current 2 is set for both the 5 V and 12 V lines. In one implementation, command current 2 is set as read channel ON for the 5 V line and is set as 1A of VCM current towards the OD for the 12 V line. In step 408, for both the 5 V and 12 V lines, the host and drive ADC voltages are measured at command current 2, and the 5 V and 12 V ADC currents are measured at command current 2. Thus, the following values are obtained in step 408:

5 V ISOFET $H5V_2$=Host 5 V voltage at command current 2 (read channel ON)

$D5V_2$=Drive 5 V voltage at command current 2 (read channel ON)

I₂(5 V) =5 V current at command current 2 (read channel ON)
12 V ISOFET
H12V₂=Host 12 V voltage at command current 2 (1A VCM current)
D12V₂=Drive 12 V voltage at command current 2 (1A VCM current)
I₂(12 V) =12 V current at command current 2 (1A VCM current)

In step 410, Rdson is calculated for both the 5 V and 12 V ISOFETs as follows:
5 V ISOFET $$Rdson_{5V} = \frac{[(H5V2 + Verror) - (D5V2 + Verror)] - [(H5V1 + Verror) - (D5V1 + Verror)]}{[(I2(5V) + VCurrentError) - (I1(5V) + VCurrentError)]}$$

$$Rdson_{5V} = \frac{(H5V2 - D5V2) - (H5V1 - D5V1)}{I2(5V) - I1(5V)}$$

$$Rdson_{5V} = \frac{\Delta V2 - \Delta V1}{I2 - I1}$$

12 V ISOFET $$Rdson_{12V} = \frac{[(H12V2 + Verror) - (D12V2 + Verror)] - [(H12V1 + Verror) - (D12V1 + Verror)]}{[(I2(12V) + VCurrentError) - (I1(12V) + VCurrentError)]}$$

$$Rdson_{12V} = \frac{(H12V2 - D12V2) - (H12V1 - D12V1)}{I2(12V) - I1(12V)}$$

$$Rdson_{12V} = \frac{\Delta V2 - \Delta V1}{I2 - I1}$$

In step 412, the voltage turnoff thresholds for the 5 V and 12 V ISOFETs are calculated as follows, using a 150 mA turnoff current for the 5 V ISOFET and a 200 mA turnoff current for the 12 V ISOFET:
5 V ISOFET
$V_{threshold}(5\ V) = I_{TurnoffCurrent}(5\ V) * RdSon_{5V}$
$V_{threshold}(5\ V) = -0.150 * Rdson_{5V}$
12 V ISOFET
$V_{threshold}(12\ V) = I_{TurnoffCurrent}(12\ V) * Rdson_{12V}$
$V_{threshold}(12\ V) = -0.200 * Rdson_{12V}$ In step 414, the voltage turnoff threshold closest to the calculated $V_{threshold}$ is selected. Thus, for the 5 V ISOFET, the closest of −4 mV, −6 mV, −9 mV and −12 mV to the calculated $V_{threshold}(5\ V)$ is selected, and for the 12 V ISOFET, the closest of −4 mV, −7 mV, −10 mV and −15 mV to the calculated $V_{threshold}(12\ V)$ is selected.

Aspects of this disclosure advantageously provide a more consistent ISOFET turnoff current level, which in turn allows for a more accurate EPOR model in which the precise time that the ISOFET will turn off is more accurately known. Without the teachings of this disclosure, which considers the Rdson value of the ISOFET in setting the voltage turnoff threshold, the ISOFET could be turned off prematurely in cases where the Rdson value is very high. Conversely, in cases where the Rdson value is very low, the ISOFET is susceptible to being turned off too late, leading to a drain of too much power from the drive supply to the host.

In addition, the firmware may be implemented in various ways in order to monitor the drive temperature. In this aspect if the drive temperature changes, the firmware can monitor via the drive temperature sensor (e.g., drive temperature sensor 350 in FIGS. 3A and 3B) which will consequently also change the ISOFET Rdson value. In one embodiment, the threshold setting is updated to a new level based upon a mathematical resistance change with temperature formula. In another embodiment, calibration sequence is recalibrated to get a more exact Rdson value to choose a new threshold because of the temperature change.

Any suitable control circuitry may be employed to implement the flow diagrams in the above examples, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one example, the read channel and disk controller are implemented as separate integrated circuits, and in an alternative example they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one example, the control circuitry comprises a microprocessor executing instructions, the instructions being operable to cause the microprocessor to perform the flow diagrams described herein. The instructions may be stored in any computer-readable medium. In one example, they may be stored on a non-volatile semiconductor memory external to the microprocessor, or integrated with the microprocessor in a SOC. In another example, the instructions are stored on the disk and read into a volatile semiconductor memory when the disk drive is powered on. In yet another example, the control circuitry comprises suitable logic circuitry, such as state machine circuitry.

A disk drive may include a magnetic disk drive, an optical disk drive, etc. In addition, while the above examples concern a disk drive, this disclosure is not limited to a disk drive and can be applied to other data storage devices and systems, such as magnetic tape drives, solid state drives, hybrid drives, etc. In addition, some embodiments may include electronic devices such as computing devices, data server devices, media content storage devices, etc. that comprise the storage media and/or control circuitry as described above.

The various features and processes described above may be used independently of one another or may be combined in various ways. All possible combinations and subcombinations are intended to fall within the scope of this disclosure. In addition, certain method, event, or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed implementations. The example systems and components described herein may be configured differently than described. For example, elements may be added to, removed from, or rearranged compared to the disclosed example embodiments.

While certain implementation examples have been described, these examples are presented by way of example only, and are not intended to limit the scope of this disclosure. Thus, nothing in the foregoing description is intended to imply that any feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the embodiments disclosed herein.

What is claimed is:

1. A data storage device comprising:
   a disk;
   a spindle motor configured to rotate the disk, wherein the spindle motor is powered by a drive voltage generated in response to a host voltage;
   a head configured to be actuated over the disk by a head actuator; and
   control circuitry comprising at least one isolation field effect transistor (ISOFET) configured to prevent a reverse current from flowing from the drive voltage to the host voltage when the host voltage falls below a threshold, wherein the control circuitry is configured to:
   set a turnoff current level at which the at least one ISOFET is directed to turn off to prevent the reverse current from flowing,
   determine a drain-source on resistance Rdson of the at least one ISOFET, and
   calculate a voltage turnoff threshold at which the at least one ISOFET is turned off from the turnoff current level and the determined Rdson.

2. The data storage device of claim 1, wherein the host voltage is coupled to a drain of the at least one ISOFET and the drive voltage is coupled to a source of the at least one ISOFET.

3. The data storage device of claim 1, wherein the control circuitry is further configured to monitor a drive temperature change via a drive temperature sensor and change the Rdson based on the drive temperature change.

4. The data storage device of claim 2, wherein, when a difference between the host voltage and the drive voltage exceeds the voltage turnoff threshold, the control circuitry is further configured to turn the at least one ISOFET off to prevent the reverse current from flowing from the drive voltage to the host voltage.

5. The data storage device of claim 2, wherein a selected voltage turnoff threshold is selected from among multiple pre-programmed voltage turnoff thresholds, the selected voltage turnoff threshold being a closest one of the multiple pre-programmed voltage turnoff thresholds to the calculated voltage turnoff threshold.

6. The data storage device of claim 5, wherein the at least one ISOFET comprises:
   a first ISOFET, wherein a 5 V host voltage is coupled to a drain of the first ISOFET and a 5 V drive voltage is coupled to a source of the first ISOFET; and
   a second ISOFET, wherein a 12 V host voltage is coupled to a drain of the second ISOFET and a 12 V drive voltage is coupled to a source of the second ISOFET.

7. The data storage device of claim 6, wherein the turnoff current level of the first ISOFET is approximately −150 mA, and the turnoff current level of the second ISOFET is approximately −200 mA.

8. The data storage device of claim 6, wherein the pre-programmed voltage turnoff thresholds of the first ISOFET are −4 mV, −6 mV, −9 mV and −12 mV, and the pre-programmed voltage turnoff thresholds of the second ISOFET are −4 mV, −7 mV, −10 mV and −15 mV.

9. A method for preventing reverse current flow through an isolation field effect transistor (ISOFET) of a data storage device comprising:
   setting a turnoff current level at which the ISOFET is turned off to prevent the reverse current from flowing;
   determining a drain-source on resistance Rdson of the ISOFET; and
   calculating a voltage turnoff threshold at which the ISOFET is turned off from the turnoff current level and the determined Rdson.

10. The method of claim 9, further comprising:
    when a difference between a host voltage and a drive voltage of the data storage device exceeds the voltage turnoff threshold, turning off the ISOFET to prevent the reverse current from flowing from the drive voltage to the host voltage.

11. The method of claim 10, further comprising:
    storing multiple pre-programmed voltage turnoff thresholds in control circuitry of the data storage device; and
    selecting a closest one of the pre-programmed voltage turnoff thresholds to the calculated voltage turnoff threshold.

12. The method of claim 11, wherein four pre-programmed voltage turnoff thresholds are stored in the control circuitry of the data storage device.

13. The method of claim 9, further comprising monitoring a drive temperature change via a drive temperature sensor and changing the Rdson based on the drive temperature change.

14. A method for preventing reverse current flow through an isolation field effect transistor (ISOFET) of a data storage device comprising:
    setting a first command current for a host voltage and a drive voltage of the data storage device;
    measuring a first host analog-to-digital (ADC) voltage, a first drive ADC voltage and a first ADC current at the first command current;
    setting a second command current for the host voltage and the drive voltage of the data storage device;
    measuring a second host ADC voltage, a second drive ADC voltage and a second ADC current at the second command current;
    calculating a Rdson of the ISOFET as $$Rdson = \frac{\Delta V2 - \Delta V1}{I2 - I1},$$

wherein $\Delta V2$ is the difference between the second host ADC voltage and the second drive ADC voltage, $\Delta V1$ is the difference between the first host ADC voltage and the first drive ADC voltage, I2 is the second ADC current and I1 is the first ADC current; and
    calculating a voltage turnoff threshold $V_{threshold}$ as an $I_{TurnoffCurrent}$ multiplied by the calculated Rdson.

15. The method of claim 14, wherein the first and second command currents are set for 5 V host and drive voltages and 12 V host and drive voltages respectively.

16. The method of claim 15, wherein:
    the first command current is set as read channel OFF for the 5 V host and drive voltages; and
    the first command current is set as 500 mA of VCM current towards an outer diameter (OD) of a disk for the 12 V host and drive voltages.

17. The method of claim 16, wherein:
    the second command current is set as read channel ON for the 5 V host and drive voltages; and the second command current is set as 1A of VCM current towards the OD of the disk for the 12 V host and drive voltages.

18. The method of claim 17, wherein calculating the Rdson comprises calculating a $Rdson_{5V}$ for a 5 V ISOFET and a $Rdson_{12V}$ for a 12 V ISOFET.

19. The method of claim 18, wherein $$Rdson_{5V} = \frac{[(H5V2 + Verror) - (D5V2 + Verror)] - [(H5V1 + Verror) - (D5V1 + Verror)]}{[(I2(5V) + VCurrentError) - (I1(5V) + VCurrentError)]}$$

and $$Rdson_{12V} = \frac{[(H12V2 + Verror) - (D12V2 + Verror)] - [(H12V1 + Verror) - (D12V1 + Verror)]}{[(I2(12V) + VCurrentError) - (I1(12V) + VCurrentError)]}.$$

20. The method of claim 18, wherein a 150 mA turnoff current is used for the 5 V ISOFET and a 200 mA turnoff current is used for the 12 V ISOFET.

21. The method of claim 14, further comprising: selecting a pre-programmed voltage turnoff threshold that is closest to the calculated voltage turnoff threshold.

* * * * *